United States Patent
Zhang et al.

(10) Patent No.: US 12,208,757 B1
(45) Date of Patent: Jan. 28, 2025

(54) INTERNET-BASED VEHICLE START ASSIST SYSTEM AND METHOD THEREOF

(71) Applicant: Zhejiang Tiantong Electronic Information Materials Research Institute Co., Ltd., Zhejiang (CN)

(72) Inventors: Ruibiao Zhang, Zhejiang (CN); Bingbing Xing, Zhejiang (CN); Zhanhua Ma, Zhejiang (CN); Yanyan Song, Zhejiang (CN); Kaisheng Zhang, Zhejiang (CN)

(73) Assignee: Zhejiang Tiantong Electronic Information Materials Research Institute Co., Ltd., Zhejiang (CN)

( * ) Notice: Subject to any disclaimer, the term of this patent is extended or adjusted under 35 U.S.C. 154(b) by 0 days.

(21) Appl. No.: 18/761,506

(22) Filed: Jul. 2, 2024

(30) Foreign Application Priority Data

Sep. 19, 2023 (CN) .......................... 202311211756.6

(51) Int. Cl.
*H02J 7/00* (2006.01)
*B60R 16/033* (2006.01)

(52) U.S. Cl.
CPC ............ *B60R 16/033* (2013.01); *H02J 7/007* (2013.01); *H02J 2207/20* (2020.01)

(58) Field of Classification Search
CPC .............................. B60R 16/033; H02J 7/007
See application file for complete search history.

(56) References Cited

U.S. PATENT DOCUMENTS

| | | | |
|---|---|---|---|
| 2014/0148975 A1* | 5/2014 | Self | .......................... F25B 19/00 701/2 |
| 2014/0200742 A1* | 7/2014 | Mauti, Jr. | ........... F02N 11/0807 701/2 |

* cited by examiner

*Primary Examiner* — Robert Grant
(74) *Attorney, Agent, or Firm* — Leech Tishman Fuscaldo & Lampl, LLC (57) ABSTRACT

An Internet-based vehicle start assist system and a method thereof are disclosed. The system includes: an onboard battery, an onboard charging system, an onboard SMS transceiver module, a microprocessor, a standby battery, a DO socket line, and a voltage step-down module I. When a vehicle is parked for a long time or onboard electrical equipment is forgotten to be turned off for a long time after parking, the system can automatically detect a voltage of the onboard battery, and if the onboard battery is undervoltage, the system notifies a driver through an SMS message; and when the onboard battery is out of power supply and the driver is in urgent need of the vehicle, the system can automatically switch to the standby battery to supply power to onboard equipment, thereby helping the driver start the vehicle smoothly and improving use experience of the vehicle.

18 Claims, 4 Drawing Sheets

INTERNET-BASED VEHICLE START ASSIST SYSTEM AND METHOD THEREOF

CROSS REFERENCE TO RELATED APPLICATION

This patent application claims the benefit and priority of Chinese Patent Application No. 202311211756.6, filed with the China National Intellectual Property Administration on Sep. 19, 2023, the disclosure of which is incorporated by reference herein in its entirety as part of the present application.

TECHNICAL FIELD

The present disclosure relates to the technical field of intelligent connected vehicles, and in particular, to an Internet-based vehicle start assist system and a method thereof.

BACKGROUND ART

With the continuous development of China's economy, the number of vehicles in use is increasing. According to statistics from the Ministry of Public Security, as of August 2023, the number of vehicles in China has reached 430 million, which is still rising.

As a common means of transportation, vehicles play an important role in daily travel. A power supply system in a vehicle provides a stable power supply for the normal operation of the vehicle. More specifically, when an engine of the vehicle is just started or runs at a low speed, electrical energy required for the engine, an ignition system, onboard electrical equipment, and the like is all provided by an onboard battery because a generator does not generate power or a voltage is very low. When the engine of the vehicle is running normally, the generator starts to supply power to the onboard electrical equipment and charges the onboard battery. When power consumption of the onboard electrical equipment exceeds a power supply capability of the generator, the onboard battery and the generator supply power to the onboard electrical equipment together.

Although the onboard battery can perform charging in real time during normal operation of the traditional vehicle, when the traditional vehicle is parked for a long time (such as a vehicle owner is on a business trip) or the onboard electrical equipment is forgotten to be turned off for a long time after parking, electric energy stored in the onboard battery is continuously consumed without timely replenishment, resulting in undercharging. In this case, the vehicle owner cannot learn a latest status of the onboard battery, and when the vehicle owner tries to use the vehicle again, there may be difficulty in starting the vehicle due to undercharging of the onboard battery, thereby seriously affecting use experience of the vehicle.

SUMMARY

A technical problem to be resolved in the present disclosure is to provide an Internet-based vehicle start assist system and a method thereof. A power supply system of a conventional vehicle is improved, so that it can be automatically determined whether an onboard battery is undercharged, and information is sent in time through the Internet to a mobile phone number reserved by a vehicle owner, to notify the vehicle owner that the onboard battery is undercharged. In addition, when the vehicle owner starts the vehicle again, if the onboard battery is undercharged, the vehicle automatically switches to a standby battery for power supply, thereby ensuring normal power supply to start the vehicle.

A technical solution of the present disclosure is to provide an Internet-based vehicle start assist system with the following structure, including an onboard battery and an onboard charging system, where the onboard charging system is connected to an input terminal of the onboard battery, and an output terminal of the onboard battery is connected to onboard electrical equipment; and further including an onboard short message service (SMS) transceiver module, a microprocessor, a standby battery, a DO socket line, and a voltage step-down module I, where an RXD terminal of the SMS transceiver module is connected to a TXD interface of the microprocessor, a TXD terminal of the SMS transceiver module is connected to an RXD interface of the microprocessor, and a G1 terminal of the SMS transceiver module is connected to a P0.16 interface of the microprocessor; an input terminal of the standby battery is connected to an output terminal of the onboard charging system, a discharging control terminal of the standby battery is connected to a GPIO2 interface of the microprocessor, an output terminal of the standby battery is connected to an input terminal of the DO socket line, and an output terminal of the DO socket line is connected to the onboard electrical equipment; and an input terminal of the voltage step-down module I is connected to a positive electrode of the output terminal of the onboard battery, and an output terminal of the voltage step-down module I is connected to an AD1 interface of the microprocessor.

In the Internet-based vehicle start assist system in the present disclosure, a charging switch is disposed between the standby battery and the onboard charging system, an input terminal of the charging switch is connected to the onboard charging system, a charging control terminal of the charging switch is connected to a GPIO1 interface of the microprocessor, and an output terminal of the charging switch is connected to the input terminal of the standby battery.

The Internet-based vehicle start assist system in the present disclosure further includes a voltage step-down module II, where an input terminal of the voltage step-down module II is connected to a positive terminal of the standby battery, and an output terminal of the voltage step-down module II is connected to an AD2 interface of the microprocessor.

The Internet-based vehicle start assist system in the present disclosure further includes a display system and a voltage step-down module III, where the display system is connected to a display interface of the microprocessor, an input terminal of the voltage step-down module III is connected to an output terminal of an onboard generator, and an output terminal of the voltage step-down module III is connected to an AD0 interface of the microprocessor.

The Internet-based vehicle start assist system in the present disclosure further includes a parameter setting module, and the parameter setting module is connected to the microprocessor.

The Internet-based vehicle start assist system in the present disclosure further includes a clock system, and the clock system is connected to the microprocessor.

Based on the foregoing technical problem to be resolved, the present disclosure further provides an Internet-based vehicle start assist method, including the following steps:

when a vehicle is parked for a long time or onboard electrical equipment is forgotten to be turned off for a long time after parking, collecting, by a microprocessor, a voltage of an onboard battery in real time through a voltage step-down module I, and determining whether the voltage is less than a specified threshold, where if yes, the onboard battery is undervoltage;

sending, by the microprocessor through an SMS transceiver module, undervoltage information of the onboard battery to a mobile phone number reserved by a vehicle owner; and determining, by the microprocessor in real time, whether an engine of the vehicle is started, and if the engine is being started when the onboard battery is undervoltage, automatically switching to a standby battery to supply power to onboard electrical equipment.

The Internet-based vehicle start assist method in the present disclosure includes: after the vehicle is started, determining, through a voltage step-down module II, whether the standby battery is undervoltage, and if a voltage of the standby battery is less than the specified threshold, connecting an onboard charging system to charge the standby battery; and when the vehicle is parked for a long time or the onboard electrical equipment is forgotten to be turned off for a long time after parking, collecting a voltage of the standby battery in real time through the voltage step-down module II, determining whether the voltage is less than the specified threshold, and if yes, sending, by the microprocessor through the SMS transceiver module, undervoltage information of the standby battery to the mobile phone number reserved by the vehicle owner.

In the Internet-based vehicle start assist method in the present disclosure, an interval alert time and the number of SMS alerts after the battery is undervoltage may be manually set by the vehicle owner in advance through a parameter setting module.

The Internet-based vehicle start assist method in the present disclosure includes: when a generator of the vehicle works normally, if a voltage is less than the specified threshold, performing display through an onboard display system, and giving an alarm to a driver.

After the foregoing structure is used, compared with the prior art, the Internet-based vehicle start assist system and the method thereof in the present disclosure have the following advantages:

1. When a vehicle is parked for a long time or onboard electrical equipment is forgotten to be turned off for a long time after parking, a microprocessor can detect an onboard battery in real time, send undercharge information of the onboard battery through an SIM message to a mobile phone number reserved by a vehicle owner, and notify the vehicle owner of a current status of the onboard battery, so as to remind the vehicle owner to extend operation time of the vehicle as long as possible during the follow-up use to maintain sufficient electricity of the onboard battery and effectively protect the onboard battery.

2. When the onboard battery is undervoltage due to long-term parking, but the vehicle owner is in urgent need of travel, the vehicle can automatically switch to a standby battery as a starting power supply at the moment of engine startup, and supply power to the onboard electrical equipment, thereby ensuring smooth start of the vehicle and normal operation of other electrical equipment, so as to improve use experience of the vehicle owner.

3. When the vehicle owner is on a business trip in another city and has a special need to know a battery status of the vehicle after a period of time, in order to use the vehicle in time after the business trip, the owner can remotely modify operation parameters of the system by sending an SMS message to understand the current status of the battery in time.

REFERENCE NUMERALS IN FIG. 2

S1: Start
S2: Receive an SMS message
S3: Clear SMS alerts MB0, MC0, MZ0
S4: Read the SMS message and modify parameters T0, MC0, MB0, MZ0 . . .
S5: Set parameters in the vehicle
S6: Set preset parameters T0, MC0, MB0, MZ0 . . .
S7: Engine starts
S8: Set a parking initial electric power
S9: Read a parking initial electric power value and save the power value as EP0
S10: Read a parking electric power value EP
S11: The headlights flash three times; The horn sounds three times; Send an SMS message "The onboard electrical equipment is not turned off"; BZ=0
S12: Interval alert time T=T0
S13: Detect a voltage of a standby battery Detect a voltage of an onboard battery
S14: The standby battery is undervoltage
S15: Send an SMS message "The standby battery is undervoltage"
S16: SMS alerts MB=MB0−1
S17: The onboard battery is undervoltage
S18: Send an SMS message "The standby battery and the onboard battery are undervoltage"
S19: SMS alerts MZ=MZ0−1
S20: The onboard battery is undervoltage
S21: Send an SMS message "The onboard battery is undervoltage"
S22: SMS alerts MC=MC0−1
S23: The microprocessor enters a power-off mode
S24: Wake up the power-off mode
S25: Set a parking alert flag BZ=1
S26: Detect a voltage of a standby battery
S27: The standby battery is undervoltage
S28: The standby battery is connected to the generator at an output terminal of the generator
S29: Charge the standby battery
S30: Clear SMS alerts MB0, MC0, MZ0
S31: Detect a voltage of the engine
S32: The engine is undervoltage
S33: Onboard dashboard displays "The onboard generator is faulty"

DETAILED DESCRIPTION OF THE EMBODIMENTS

The following further describes in detail an Internet-based vehicle start assist system and a method thereof in the present disclosure with reference to the accompanying drawings and specific implementations.

Figure 1:
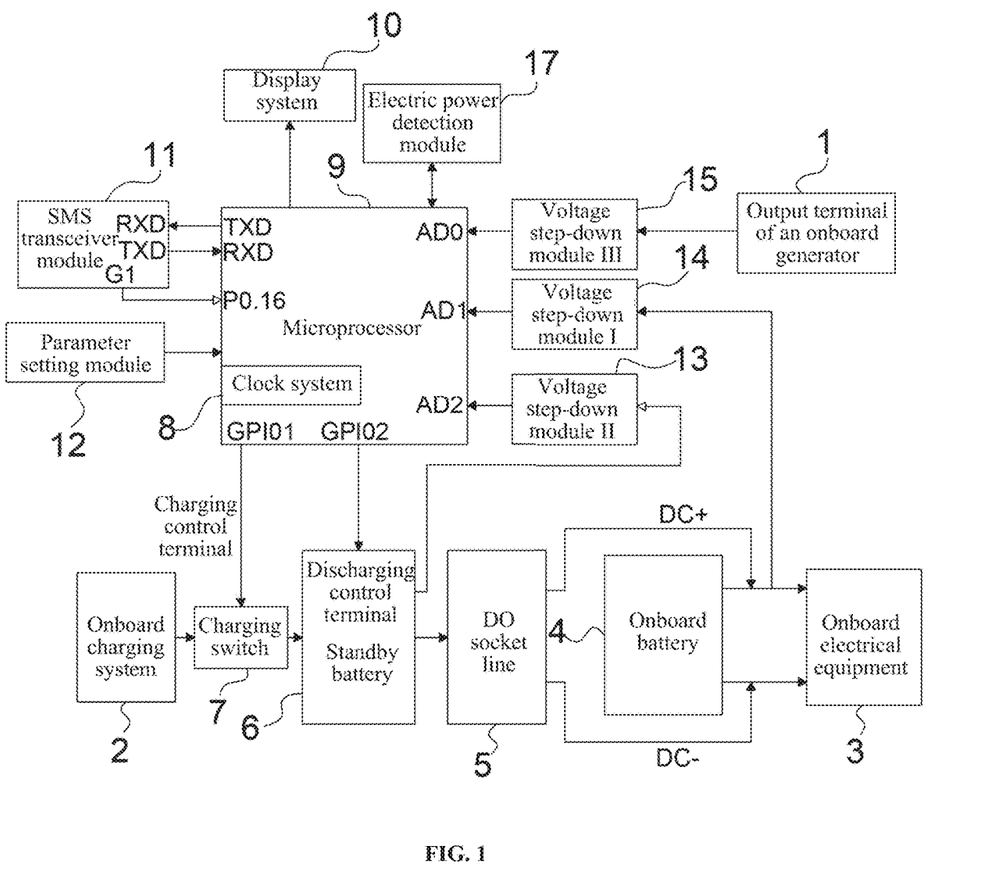
FIG. 1 is a structural block diagram of an Internet-based vehicle start assist system according to the present disclosure.

As shown in FIG. 1, an Internet-based vehicle start assist system includes an onboard battery 4, an onboard charging system 2, an onboard SMS transceiver module 11, a microprocessor 9, a standby battery 6, a DO socket line 5, and a voltage step-down module 114. The onboard charging system 2 is connected to an input terminal of the onboard battery 4, to charge the onboard battery 4 during normal operation of a vehicle, and an output terminal of the onboard battery 4 is connected to onboard electrical equipment 3, to supply power to the onboard electrical equipment 3. An RXD terminal of the SMS transceiver module 11 is connected to a TXD interface of the microprocessor 9, and a TXD terminal of the SMS transceiver module 11 is connected to an RXD interface of the microprocessor 9, to send an SMS message to a mobile phone number reserved by a vehicle owner and notify an undervoltage status of the battery. A G1 terminal of the SMS transceiver module 11 is connected to a P0.16 interface of the microprocessor 9. Herein, the P0.16 interface of the microprocessor 9 serves as an EINT0 function, and is mainly configured to receive an SMS message that is sent remotely by the vehicle owner to modify and set operation parameters of the system. For example, when the vehicle owner parks the vehicle for a business trip and wants to learn a current status of the battery of the vehicle after a period of time (for example, 5 days), in order to use the vehicle in time after the business trip, the owner can send an SMS message to the SMS transceiver module 11 by using a mobile phone. After the SMS transceiver module 11 receives the SMS message that is sent remotely by the vehicle owner to modify and set the operation parameters of the system, the system feeds back the current status of the battery to the vehicle owner according to the parameters preset in the SMS message.

An input terminal of the standby battery 6 is connected to an output terminal of the onboard charging system 2, a discharging control terminal of the standby battery 6 is connected to a GPIO2 interface of the microprocessor 9, an output terminal of the standby battery 6 is connected to an input terminal of the DO socket line 5, and an output terminal of the DO socket line 5 is connected to the onboard electrical equipment 3. The DO socket line 5 adopts a thick copper core, which is more secure and stable. An input terminal of the voltage step-down module 114 is connected to a positive electrode of the output terminal of the onboard battery 4, to perform buck chopper processing, and an output terminal of the voltage step-down module 114 is connected to an analog-to-digital conversion channel AD1 interface of the microprocessor 9, to detect a voltage status of the onboard battery 4 and determine whether the onboard battery 4 is undervoltage. If the onboard battery 4 is undervoltage when the vehicle is parked for a long time, undervoltage information is sent to the mobile phone number reserved by the vehicle owner. If the onboard battery 4 is undervoltage when the vehicle is starting, the system automatically switches to the standby battery 6 to supply power to the onboard electrical equipment 3, so as to ensure normal start of the vehicle.

For an electrical connection between the DO socket line 5, the onboard battery 4, the onboard electrical equipment 3, and the voltage step-down module 114, the following structure may also be used: A positive output terminal of the DO socket line 5 is fastened to a positive terminal of the onboard battery 4 through an electrical clip, a negative output terminal of the DO socket line 5 is fastened to a negative terminal of the onboard battery 4 through an electrical clip, and the positive terminal of the onboard battery 4 is connected to a positive terminal of the onboard electrical equipment 3 and is also connected to the input terminal of the voltage step-down module 114 in addition to the positive output terminal of the DO socket line 5. In a normal case, an output voltage of the positive terminal of the onboard battery 4 is about 12V, and is raised to 13V to 14V after the vehicle is started. In addition to being connected to the negative output terminal of the DO socket line 5, the negative terminal of the onboard battery 4 is connected to the negative terminal of the onboard electrical equipment 3.

In this embodiment, the microprocessor 9 is specifically an embedded microprocessor powered by the onboard battery 4 with a model LPC2103 (a power supply voltage is 3.3V), and has low power consumption and stable performance, and is currently a commercially available product. Certainly, other modes of microprocessors having the same function may also be used. Because a voltage required by the microprocessor 9 to operate is very low, the microprocessor 9 can operate normally even when the onboard battery 4 is undervoltage.

When the onboard battery 4 is undervoltage due to long-term parking, but the vehicle owner is in urgent need of travel, the microprocessor 9 can automatically switch to the standby battery 6 as a starting power supply at the moment of engine startup, and supply power to the onboard electrical equipment 3, thereby ensuring smooth start of the vehicle and normal operation of other electrical equipment. In addition, when the vehicle is running normally, the microprocessor 9 can discharge the standby battery 6 periodically through the GPIO2 interface, so as to ensure battery performance, prolong a service life, and ensure that the standby battery 6 is stable and reliable and has a good implementation effect.

A charging switch 7 is disposed between the standby battery 6 and the onboard charging system 2, an input terminal of the charging switch 7 is connected to the output terminal of the onboard charging system 2, a charging control terminal of the charging switch 7 is connected to a GPIO1 interface of the microprocessor 9, to control charging of the standby battery 6, and an output terminal of the charging switch 7 is connected to the input terminal of the standby battery 6. Through this structure, the standby battery 6 can be selectively charged, for example, periodically charged according to a specified use time.

To charge the standby battery 6 in a more timely and effective manner and learn of the undervoltage status of the standby battery 6, the present disclosure further includes a voltage step-down module II13. An input terminal of the voltage step-down module II13 is connected to a positive terminal of the standby battery 6, to perform buck chopper processing, and an output terminal of the voltage step-down module II13 is connected to an analog-to-digital conversion channel AD2 interface of the microprocessor 9. In normal use, the microprocessor 9 detects the undervoltage status of the standby battery 6 in real time through the voltage step-down module II13 and determines whether the standby battery 6 is undervoltage. When a voltage of the standby battery 6 is less than a specified threshold (generally, 12V), during normal running of the vehicle, the charging switch 7 is automatically turned on under control of the microprocessor 9, to charge the standby battery 6 through the onboard charging system 2. After the vehicle is parked for a long time, the microprocessor 9 also detects the undervoltage status of the standby battery 6 in real time through the voltage step-down module II13. When the voltage of the standby battery 6 is less than the specified threshold, the microprocessor 9 sends, through the SMS transceiver module 11 in time, undervoltage information to the mobile phone number reserved by the vehicle owner, so as to remind the vehicle owner to take corresponding measures as soon as possible.

In this embodiment, the standby battery 6 is mounted on the vehicle by using a small easy-to-disassemble structure, so as to facilitate the vehicle owner in disassembling, maintaining, and replacing. For a specific easy-to-disassemble structure, a structure in the prior art such as a clamp lock structure may be used, provided that the requirement for easy disassembly can be met. Details are not described herein.

After the auxiliary system in the present disclosure detects that the battery is undervoltage, content of the SMS message sent to the mobile phone number reserved by the vehicle owner is as follows:

1. If the onboard battery 4 is undervoltage, the content of the SMS message is: "The onboard battery is undervoltage. When the vehicle starts, the system will automatically switch to the standby battery for emergency. When you use the vehicle, please extend the running time of the vehicle and charge the onboard battery. If you repeatedly receive this message, please pay attention to maintenance of the onboard battery".

2. If the standby battery 6 is undervoltage, the content of the SMS message is: "The standby battery is undervoltage, and the vehicle starts normally. When you use the vehicle, please extend the running time of the vehicle and fully charge the standby battery. If you repeatedly receive this message, please remove the standby battery and charge it indoors, and pay attention to daily maintenance and replacement of the standby battery".

3. If both the onboard battery 4 and the standby battery 6 are undervoltage, the content of the SMS message is: "The onboard battery and the standby battery are undervoltage at the same time. The system cannot work normally when the vehicle is started. After the vehicle fails to start, please remove the standby battery and charge it indoors, and pay attention to maintenance and replacement of the battery".

In addition to sending an SMS message to the vehicle owner when the battery is undercharged, if the vehicle owner parks the vehicle for a business trip and wants to learn a status of the battery at a predetermined time, the vehicle owner can also remotely send, through a mobile phone to the vehicle, an SMS message to modify a system working parameter, and the SMS transceiver module 11 receives the SMS message. At this time, there are two cases: 1. If the microprocessor 9 is still working normally, the system reads content in the SMS message quickly, detects the current status of the battery according to a time specified in the SMS message, and then feeds back corresponding data to the mobile phone of the vehicle owner in time. 2. If the battery is undercharged and the microprocessor 9 is in a sleep state after sending specified reminder messages to the mobile phone of the vehicle owner according to a previously set parameter, an SMS signal reception indication terminal G1 triggers a P0.16 (EINT0) signal terminal of the microprocessor 9, and wakes up the microprocessor 9 from a power-down energy-saving mode, so that the microprocessor 9 starts to work normally, starts to read content in the SMS message, detects the current status of the battery according to the specified time, and feeds back corresponding data to the mobile phone of the vehicle owner in time.

When the microprocessor 9 is in a sleep state, a process of setting the system working parameter remotely by the vehicle owner through an SMS message is as follows:

The vehicle owner sends an SMS message to modify and set the system working parameter, the SMS transceiver module 11 receives the SMS message, and the SMS signal reception indication terminal G1 triggers the P0.16 (EINT0) signal interface of the microprocessor 9, to wake the microprocessor 9 from a power-down energy-saving mode, so that the microprocessor 9 starts to work normally. The microprocessor 9 clears the number of previous SMS alerts, and reads data that modifies the system working parameter in content of the current SMS message. For example, if the vehicle owner needs to be on a business trip for another five days and wants to learn about the battery status of the vehicle after five days, the vehicle owner may send an SMS message "T0=5 days" to the vehicle. After five days, the vehicle owner receives an SMS message, "The standby battery is not undervoltage" from the vehicle, and therefore the vehicle owner can use the vehicle without worry.

In addition to the foregoing functions, the present disclosure further includes a display system 10 and a voltage step-down module III15. The display system 10 is connected to a display interface of the microprocessor 9, an input terminal of the voltage step-down module III15 is connected to an output terminal 1 of an onboard generator, to perform buck chopper processing, and an output terminal of the voltage step-down module III15 is connected to an AD0 interface of the microprocessor 9. The analog-to-digital conversion channel AD0 interface of the microprocessor 9 is connected to a positive input terminal of the onboard generator through the voltage step-down module III15, and is mainly configured to detect an output voltage status of the onboard generator and determine whether a charging function of the onboard generator is normal. If the charging function is abnormal, reminder information is sent to the display system to remind the vehicle owner.

In the present disclosure, a parameter setting module 12 is further disposed, and the parameter setting module 12 is connected to the microprocessor 9. The parameter setting module 12 may be used by the vehicle owner to manually set an interval alert time T0, the number MC0 of SMS alerts "The onboard battery is undervoltage", the number MB0 of SMS alerts "The standby battery is undervoltage", and the number MZ0 of SMS alerts "The onboard battery and the standby battery are undervoltage" as required, which is more intelligent.

When the vehicle is being started and then stopped, it is intelligently determined whether there is any electrical equipment that is not turned off in the vehicle, to immediately alert the vehicle owner so as to avoid potential issues if any are found. Therefore, an electric power detection module 17 is connected to the microprocessor 9 in this embodiment. The microprocessor 9 detects and reads, through the electric power detection module 17, "a parking electric power EP" when the vehicle is turned off and stopped, and compares EP with "a parking initial electric power EP0". If EP−EP0>0 is true, it indicates that when the vehicle is turned off and stopped, the electrical equipment in the vehicle is not turned off (for example, an onboard lamp is not turned off, and because a vehicle steering switch is partially not reset, a headlamp is turned on when the vehicle is turned off and stopped). In this case, the system immediately controls "three times of double flashing, three times of horn honking, and three times of SMS alerts", and notifies the vehicle owner to take actions (for example, turning off interior lighting, and resetting the vehicle steering switch), so as to prevent potential issues. If EP−EP0>0 is not true, a procedure of determining "interval alert time T=T0" is performed.

This alert reminder is used only once when the vehicle is being started and then stopped.

Steps for setting the parking initial electric power EP0 are as follows: The vehicle owner starts the vehicle by igniting it, then turns off the vehicle and parks it, turns off the onboard electrical equipment, and resets an electrical switch. When a system display prompts "Set a parking initial electric power," if the vehicle owner inputs "Y" through the "parameter setting module", the microprocessor 9 reads the parking initial electric power through the electric power detection module 17 and stores the power as EP0 (EP0 represents an electric power consumed by the system when the vehicle is turned off and parked). When the system display prompts "Set a parking initial electric power", the vehicle owner does not input any information, and the system will continue to enter a subsequent procedure after a delay of three seconds. This is generally set only once during system installation but can also be set during system verification.

A clock system 8 in the present disclosure is connected to the microprocessor 9, or may be integrated into the microprocessor 9, to count the number of interval alerts. Based on this, the present disclosure further provides an Internet-based vehicle start assist method, including the following steps:

When a vehicle is parked for a long time or onboard electrical equipment is forgotten to be turned off for a long time after parking, a microprocessor 9 collects a voltage of an onboard battery 4 in real time through an AD1 interface and a voltage step-down module II4, compares the voltage with a standard value (generally, a standard voltage of a vehicle battery is 12V), and determines whether the voltage is less than a specified threshold (12V), where if yes, the onboard battery 4 is undervoltage.

The microprocessor 9 sends, through an SMS transceiver module 11, undervoltage information of the onboard battery 4 to a mobile phone number reserved by the vehicle owner, and notifies the vehicle owner that the onboard battery 4 is undervoltage.

The microprocessor 9 determines, in real time, whether an engine of the vehicle is started, and if the engine is being started when the onboard battery 4 is undervoltage, the microprocessor 9 quickly sends a control signal to a discharging control terminal of a standby battery 6 through a GPIO2 interface, so as to automatically switch to the standby battery 6 to supply power to onboard electrical equipment 3. The standby battery 6 connects DC+ and DC− voltages to positive and negative terminals of the onboard battery 4 through a DO socket line 5, so as to supply power to the onboard electrical equipment 3 in time, thereby ensuring normal ignition and starting of the vehicle.

After the vehicle is started, the microprocessor 9 determines, through a voltage step-down module II13, whether the standby battery 6 is undervoltage. If a voltage of the standby battery 6 is less than the specified threshold (12V), the microprocessor 9 sends a signal to a charging control terminal of a charging switch 7 through a GPIO1 interface, so that an onboard charging system 2 charges the standby battery 6. The microprocessor 9 may also send a signal to the discharging control terminal of the standby battery 6, so as to discharge the standby battery 6 after sufficient power supply. The standby battery 6 is periodically charged and discharged, to fully maintain activity of the standby battery 6 and implement intelligent management, thereby protecting the battery of the vehicle from long-term disuse-induced depletion.

When the vehicle is parked for a long time or the onboard electrical equipment is forgotten to be turned off for a long time after parking, the microprocessor 9 collects a voltage of the standby battery 6 through an AD2 interface and the voltage step-down module II13, and compares the voltage with the standard value (generally, the standard voltage of the vehicle battery is 12V), where if yes, it indicates that the standby battery 6 is undervoltage. The microprocessor 9 sends, through the SMS transceiver module 11, undervoltage information of the standby battery 6 to the mobile phone number reserved by the vehicle owner, to take corresponding actions in time. The standby battery 6 has a relatively small volume, and is used only when the onboard battery 4 is undervoltage and the engine of the vehicle is started. Generally, the standby battery 6 is not often used, and therefore its service life is relatively long.

An interval alert time and the number of SMS alerts after the battery is undervoltage may be manually set by the vehicle owner through a parameter setting module 12, or may be set by remotely sending an SMS message by a mobile phone. In addition, after a generator of the vehicle works normally, the microprocessor 9 detects an output voltage of the onboard generator in real time through an analog-to-digital conversion channel AD0 interface and a voltage step-down module III15. If the voltage is less than a specified threshold (generally, 13.5V), it indicates that a charging function of the onboard generator is abnormal, and a signal is sent to a display system 10. The onboard display system 10 performs alert display, to remind the driver that the generator is faulty and the battery cannot be charged normally, so as to repair the generator in time.

Figure 2:
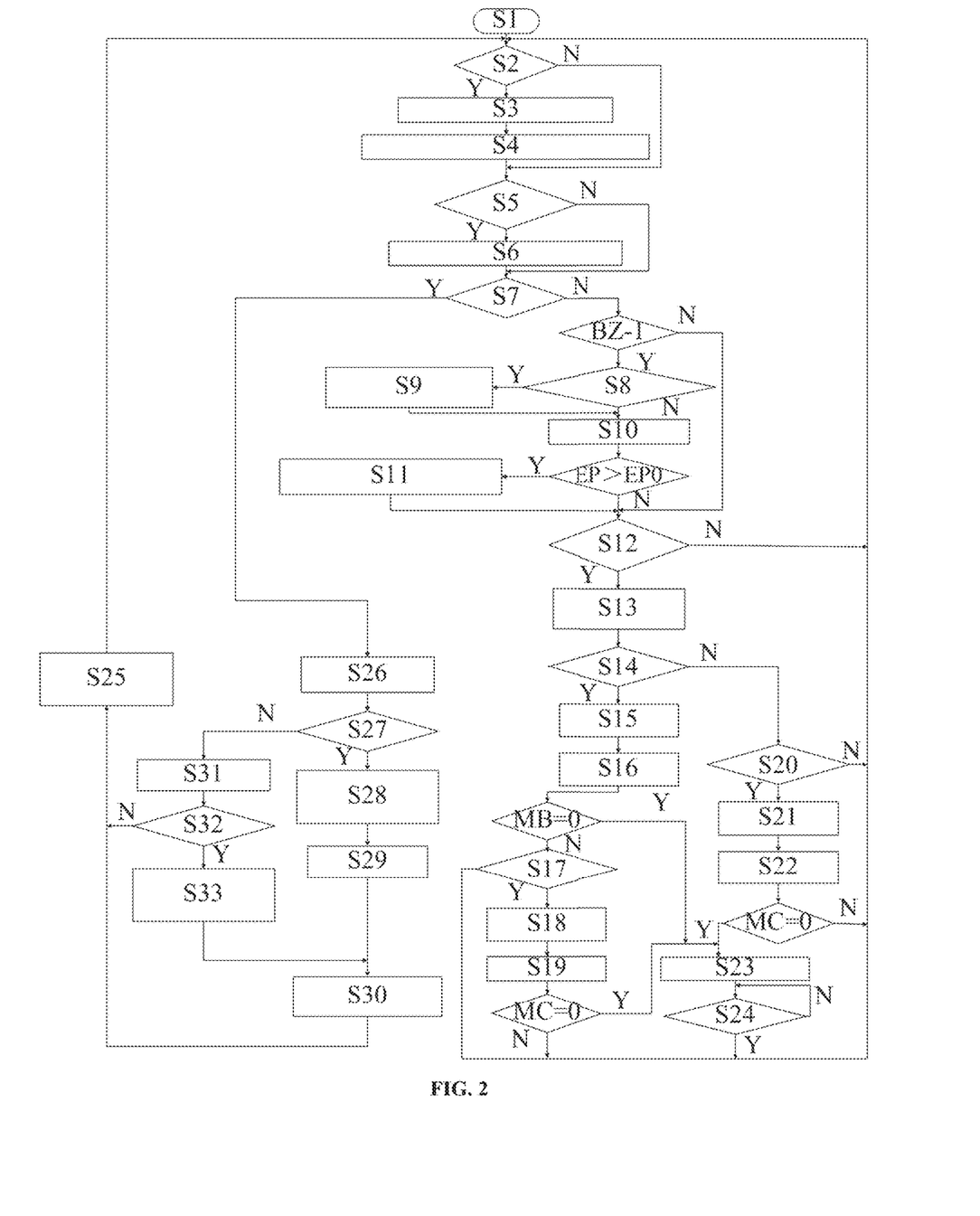
FIG. 2 is an interaction flowchart of an Internet-based vehicle start assist method according to the present disclosure.

To enable a person skilled in the art to better understand an overall procedure of the Internet-based vehicle start assist method disclosed in the embodiments of the present disclosure, an interactive software flowchart is used for detailed description. Referring to FIG. 2, a system program is stored in a memory of the microcomputer 9, and an operation flowchart is described as follows:

When the system program starts running, it is detected whether a latest remote SMS message sent by the vehicle owner is received to modify a system working parameter, and if not, the system directly proceeds to an onboard parameter setting module. If the vehicle owner needs to set the parameter as required, an interval alert time T0, the number MC0 of SMS alerts "The onboard battery is undervoltage", the number MB0 of SMS alerts "The standby battery is undervoltage", and the number MZ0 of SMS alerts "The onboard battery and the standby battery are undervoltage" may be set through the parameter setting module 12. If no parameter needs to be set, this step is skipped and a next step is performed.

The system determines "whether an engine starts". If not, the system determines whether BZ=1 is true, and if this condition is met, determines "Set a parking initial electric power". If the vehicle owner inputs "Y" through the "parameter setting module", the microprocessor 9 reads a parking initial electric power through an electric power detection module 17 and stores the power as EP0. When a system display prompts "Set a parking initial electric power", the vehicle owner does not input any information, and the system will continue to enter a subsequent procedure after a delay of three seconds (This is generally set only once during system installation but can also be set during system verification).

A difference between a current electric power EP and the parking initial electric power EP0 is determined. If EP>EP0 is true, it indicates that when the vehicle is turned off and stopped, electrical equipment in the vehicle is not turned off (for example, an onboard lamp is not turned off, and because a vehicle steering switch is partially not reset, a headlamp is turned on when the vehicle is turned off and stopped). In this case, the system immediately controls "three times of double flashing, three times of horn honking, and three times of SMS alerts", and notifies the vehicle owner to take actions (for example, turning off interior lighting and resetting the vehicle steering switch), so as to prevent potential issues. If EP−EP0>0 is not true, a next procedure is performed.

It is determined whether an interval alert time T=T0. If this condition is not met, the program returns to "Start" to run again. If this condition is met, a voltage of the standby battery and a voltage of the onboard battery are detected, and it is determined "whether the standby battery is undervoltage". If this condition is met, an SMS message "The standby battery is undervoltage, and the vehicle starts normally. When you use the vehicle, please extend the running time of the vehicle and fully charge the standby battery. If you repeatedly receive this message, please remove the standby battery and charge it indoors, and pay attention to maintenance of the standby battery" is sent. The number of SMS alerts MB=MB0−1, and it is determined whether MB0=0. If this condition is met, the program enters a power-off mode of the microprocessor (in the power-off mode, power consumption is almost 0, and the microprocessor starts to work normally when the vehicle is started). If MB=0 is not true, it is determined whether the onboard battery is undervoltage. If this condition is met, an SMS message "The onboard battery and the standby battery are undervoltage at the same time. The system cannot work normally when the vehicle is started. After the vehicle fails to start, please remove the standby battery and charge it indoors, and pay attention to maintenance of the battery" is sent. The number of SMS alerts MZ=MZ0−1, and it is determined whether MZ0=0. If this condition is met, the program enters a power-off mode of the microprocessor (in the power-off mode, power consumption is almost 0, and the microprocessor starts to work normally when the vehicle is started). If MZ=0 is not true, the program returns to "Start" and runs again. If the standby battery is not undervoltage, it is determined whether the onboard battery is undervoltage. If the onboard battery is not undervoltage, the program returns to "Start" and runs again. If the onboard battery is undervoltage, an SMS message "The onboard battery is undervoltage. When the vehicle starts, the system will automatically switch to the standby battery for emergency. When you use the vehicle, please extend the running time of the vehicle and charge the onboard battery. If you repeatedly receive this message, please pay attention to maintenance of the onboard battery" is sent. The number of SMS alerts MC=MC0−1, and it is determined whether MC0=0. If this condition is met, the program enters a power-off mode of the microprocessor (in the power-off mode, power consumption is almost 0, and the microprocessor starts to work normally when the vehicle is started). If MC=0 is not true, the program returns to "Start" and runs again.

If the engine is started, the microprocessor 9 detects, through a voltage step-down module II13, whether the standby battery is undervoltage. If the standby battery is not undervoltage, the microprocessor 9 detects whether an output terminal of a generator is undervoltage. If no, the program sets "Parking alert flag BZ=1" and then returns to "Start" to run again. If the generator is undervoltage, an on-board dashboard displays "The onboard generator is faulty", and the microprocessor 9 controls the program to clear SMS alerts MB0, MC0, MZ0, and set "Parking alert flag BZ=1" and then return to "Start" to run again. If the standby battery is undervoltage, the system controls the standby battery to be connected to an onboard charging system to charge the standby battery, and the microprocessor 9 controls the program to clear SMS alerts MB0, MC0, MZ0, and set "Parking alert flag BZ=1" and then return to "Start" to run again.

Figure 3:
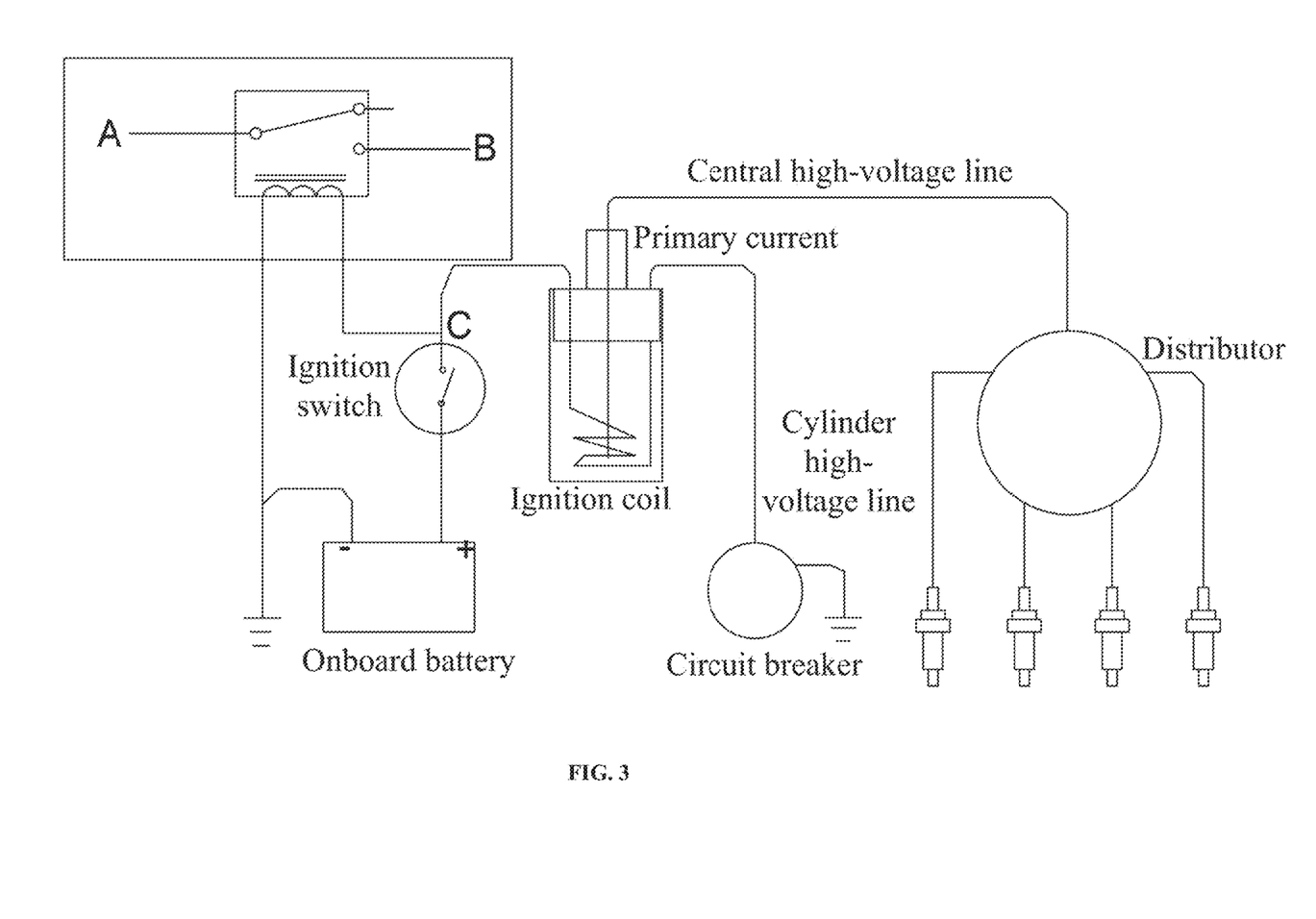
FIG. 3 is a schematic diagram of "reset" of a microprocessor triggered by "ignition" according to the present disclosure.
Figure 4:
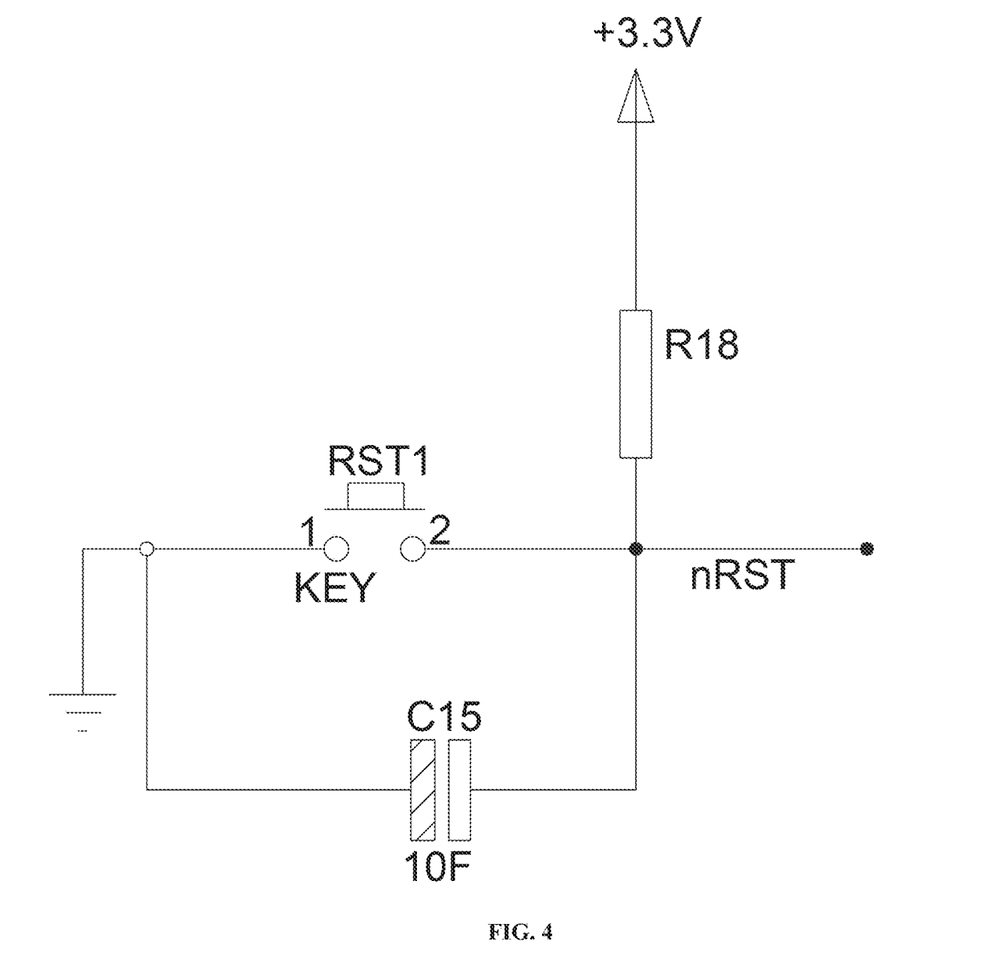
FIG. 4 is a schematic diagram of reset of a microprocessor according to the present disclosure.

FIG. 3 is a schematic diagram of "reset" of a microprocessor triggered by "ignition" according to the present disclosure. When a vehicle starts ignition, a point "C" in FIG. 3 is connected instantaneously, causing a relay in a dashed box to be energized. "Normally open" contacts "A" and "B" of the relay are short-circuited in a short time. Because the contacts "A" and "B" are separately connected to "1" and "2" in a reset circuit of a microprocessor in FIG. 4, the microprocessor is reset and the system starts to work. In this action, the microprocessor 9 may be switched from a "power-down energy-saving mode" to a "normal working mode".

Through the above improved technical solutions, the present disclosure achieves the following beneficial effects:

1. When a vehicle is parked for a long time or onboard electrical equipment is forgotten to be turned off for a long time after parking, a microprocessor can detect an onboard battery in real time, send undercharge information of the onboard battery through an SIM message to a mobile phone number reserved by a vehicle owner, and notify the vehicle owner of a current status of the onboard battery, so as to remind the vehicle owner to extend operation time of the vehicle as long as possible during the follow-up use to maintain sufficient electricity of the onboard battery and effectively protect the onboard battery.

2. When the onboard battery is undervoltage due to long-term parking, but the vehicle owner is in urgent need of travel, the vehicle can automatically switch to a standby battery as a starting power supply at the moment of engine startup, and supply power to the onboard electrical equipment, thereby ensuring smooth start of the vehicle and normal operation of other electrical equipment, so as to improve use experience of the vehicle owner.

3. When the vehicle owner is on a business trip in another city and has a special need to know a battery status of the vehicle after a period of time, in order to use the vehicle in time after the business trip, the owner can remotely modify operation parameters of the system by sending an SMS message to understand the current status of the battery in time.

4. An intelligent management manner is used to periodically charge and discharge the standby battery when the vehicle is running normally, thereby protecting the battery of the vehicle from long-term disuse-induced depletion, so as to maintain activity of the battery, prolong a service life, and ensure that the battery is stable and reliable and has a good implementation effect.

5. When the vehicle is being started and then stopped, the system can intelligently determine whether there is any electrical equipment that is not turned off in the vehicle, to immediately alert the vehicle owner so as to avoid potential issues if any are found.

The embodiments described above are only descriptions of preferred implementations of the present disclosure, and do not intend to limit the scope of the present disclosure. Without departing from the design and spirit of the present disclosure, various variations and modifications made to the technical solutions of the present disclosure by those of ordinary skills in the art shall fall within the protection scope of the present disclosure.

What is claimed is:

1. An Internet-based vehicle start assist system, comprising an onboard battery (4) and an onboard charging system (2), wherein the onboard charging system (2) is connected to an input terminal of the onboard battery (4), and an output terminal of the onboard battery (4) is connected to onboard electrical equipment (3); and further comprising an onboard short message service (SMS) transceiver module (11), a microprocessor (9), a standby battery (6), a DO socket line (5), a voltage step-down module I (14), and a voltage step-down module II (13), wherein the SMS transceiver module (11) comprises an RXD terminal connected to a TXD interface of the microprocessor (9), a TXD terminal connected to an RXD interface of the microprocessor (9), and a G1 terminal connected to a P0.16 interface of the microprocessor (9);

the standby battery (6) comprises an input terminal connected to an output terminal of the onboard charging system (2), a discharging control terminal connected to a GPIO2 interface of the microprocessor (9), and an output terminal connected to an input terminal of the DO socket line (5); and an output terminal of the DO socket line (5) is connected to the onboard electrical equipment (3);

the voltage step-down module I (14) comprises an input terminal connected to a positive electrode of the output terminal of the onboard battery (4), and an output terminal connected to an AD1 interface of the microprocessor (9);

a charging switch (7) is disposed between the standby battery (6) and the onboard charging system (2), the charging switch (7) comprises an input terminal connected to the onboard charging system (2), a charging control terminal connected to a GPIO1 interface of the microprocessor (9), and an output terminal connected to the input terminal of the standby battery (6); and the voltage step-down module II (13) comprises an input terminal connected to a positive terminal of the standby battery (6), and an output terminal connected to an AD2 interface of the microprocessor (9).

2. The Internet-based vehicle start assist system according to claim 1, further comprising a display system (10) and a voltage step-down module III (15), wherein the display system (10) is connected to a display interface of the microprocessor (9), and the voltage step-down module III (15) comprises an input terminal connected to an output terminal (1) of an onboard generator, and an output terminal connected to an AD0 interface of the microprocessor (9).

3. The Internet-based vehicle start assist system according to claim 1, further comprising a parameter setting module (12), wherein the parameter setting module (12) is connected to the microprocessor (9).

4. The Internet-based vehicle start assist system according to claim 1, further comprising a clock system (8), wherein the clock system (8) is connected to the microprocessor (9).

5. A start assist method based on the Internet-based vehicle start assist system according to claim 1, comprising the following steps:

when a vehicle is parked for a long time or onboard electrical equipment is forgotten to be turned off for a long time after parking, collecting, by the microprocessor (9), a voltage of the onboard battery (4) in real time through the voltage step-down module I (14), and determining whether the voltage is less than a specified threshold, wherein if yes, the onboard battery (4) is undervoltage;

sending, by the microprocessor (9) through the SMS transceiver module (11), undervoltage information of the onboard battery (4) to a mobile phone number reserved by a vehicle owner; and determining, by the microprocessor (9) in real time, whether an engine of the vehicle is started, and if the engine is being started when the onboard battery (4) is undervoltage, automatically switching to the standby battery (6) to supply power to the onboard electrical equipment (3).

6. The start assist method according to claim 5, comprising: after the vehicle is started, determining, through the voltage step-down module II (13), whether the standby battery (6) is undervoltage, and if a voltage of the standby battery (6) is less than the specified threshold, connecting the onboard charging system (2) to charge the standby battery (6); and when the vehicle is parked for a long time or the onboard electrical equipment is forgotten to be turned off for a long time after parking, collecting a voltage of the standby battery (6) in real time through the voltage step-down module II (13), determining whether the voltage is less than the specified threshold, and if yes, sending, by the microprocessor (9) through the SMS transceiver module (11), undervoltage information of the standby battery (6) to the mobile phone number reserved by the vehicle owner.

7. The start assist method according to claim 5, wherein an interval alert time and the number of SMS alerts after the battery is undervoltage are manually set by the vehicle owner in advance through the parameter setting module (12).

8. The start assist method according to claim 7, comprising: when a generator of the vehicle works normally, if a voltage is less than the specified threshold, performing display through an onboard display system (10), and giving an alarm to a driver.

9. The start assist method according to claim 5, wherein a charging switch (7) is disposed between the standby battery (6) and the onboard charging system (2), the charging switch (7) comprises an input terminal connected to the onboard charging system (2), a charging control terminal connected to a GPIO1 interface of the microprocessor (9), and an output terminal connected to the input terminal of the standby battery (6).

10. The start assist method according to claim 9, further comprising a voltage step-down module II (13), wherein the voltage step-down module II (13) comprises an input terminal connected to a positive terminal of the standby battery (6), and an output terminal connected to an AD2 interface of the microprocessor (9).

11. The start assist method according to claim 5, further comprising a display system (10) and a voltage step-down module III (15), wherein the display system (10) is connected to a display interface of the microprocessor (9), and the voltage step-down module III (15) comprises an input terminal connected to an output terminal (1) of an onboard generator, and an output terminal connected to an AD0 interface of the microprocessor (9).

12. The start assist method according to claim 5, further comprising a parameter setting module (12), wherein the parameter setting module (12) is connected to the microprocessor (9).

13. The start assist method according to claim 5, further comprising a clock system (8), wherein the clock system (8) is connected to the microprocessor (9).

14. The start assist method according to claim 9, comprising: after the vehicle is started, determining, through the voltage step-down module II (13), whether the standby battery (6) is undervoltage, and if a voltage of the standby battery (6) is less than the specified threshold, connecting the onboard charging system (2) to charge the standby battery (6); and when the vehicle is parked for a long time or the onboard electrical equipment is forgotten to be turned off for a long time after parking, collecting a voltage of the standby battery (6) in real time through the voltage step-down module II (13), determining whether the voltage is less than the specified threshold, and if yes, sending, by the microprocessor (9) through the SMS transceiver module (11), undervoltage information of the standby battery (6) to the mobile phone number reserved by the vehicle owner.

15. The start assist method according to claim 10, comprising: after the vehicle is started, determining, through the voltage step-down module II (13), whether the standby battery (6) is undervoltage, and if a voltage of the standby battery (6) is less than the specified threshold, connecting the onboard charging system (2) to charge the standby battery (6); and when the vehicle is parked for a long time or the onboard electrical equipment is forgotten to be turned off for a long time after parking, collecting a voltage of the standby battery (6) in real time through the voltage step-down module II (13), determining whether the voltage is less than the specified threshold, and if yes, sending, by the microprocessor (9) through the SMS transceiver module (11), undervoltage information of the standby battery (6) to the mobile phone number reserved by the vehicle owner.

16. The start assist method according to claim 11, comprising: after the vehicle is started, determining, through the voltage step-down module II (13), whether the standby battery (6) is undervoltage, and if a voltage of the standby battery (6) is less than the specified threshold, connecting the onboard charging system (2) to charge the standby battery (6); and when the vehicle is parked for a long time or the onboard electrical equipment is forgotten to be turned off for a long time after parking, collecting a voltage of the standby battery (6) in real time through the voltage step-down module II (13), determining whether the voltage is less than the specified threshold, and if yes, sending, by the microprocessor (9) through the SMS transceiver module (11), undervoltage information of the standby battery (6) to the mobile phone number reserved by the vehicle owner.

17. The start assist method according to claim 12, comprising: after the vehicle is started, determining, through the voltage step-down module II (13), whether the standby battery (6) is undervoltage, and if a voltage of the standby battery (6) is less than the specified threshold, connecting the onboard charging system (2) to charge the standby battery (6); and when the vehicle is parked for a long time or the onboard electrical equipment is forgotten to be turned off for a long time after parking, collecting a voltage of the standby battery (6) in real time through the voltage step-down module II (13), determining whether the voltage is less than the specified threshold, and if yes, sending, by the microprocessor (9) through the SMS transceiver module (11), undervoltage information of the standby battery (6) to the mobile phone number reserved by the vehicle owner.

18. The start assist method according to claim 6, wherein an interval alert time and the number of SMS alerts after the battery is undervoltage are manually set by the vehicle owner in advance through the parameter setting module (12).

* * * * *